United States Patent
Jeon

(10) Patent No.: US 9,863,530 B2
(45) Date of Patent: Jan. 9, 2018

(54) METHOD AND APPARATUS FOR CONTROLLING SHIFT BASED ON RELATIVE SPEED BETWEEN HOST VEHICLE AND PRECEDING VEHICLE

(71) Applicant: HYUNDAI MOTOR COMPANY, Seoul (KR)

(72) Inventor: Byeong Wook Jeon, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 246 days.

(21) Appl. No.: 14/932,757

(22) Filed: Nov. 4, 2015

(65) Prior Publication Data

US 2017/0051825 A1   Feb. 23, 2017

(30) Foreign Application Priority Data

Aug. 21, 2015   (KR) ........................ 10-2015-0118010

(51) Int. Cl.
```
G06F 7/00      (2006.01)
F16H 61/02     (2006.01)
F16H 59/44     (2006.01)
F16H 59/18     (2006.01)
F16H 59/70     (2006.01)
F16H 59/66     (2006.01)
```
(52) U.S. Cl.
CPC ......... *F16H 61/0213* (2013.01); *F16H 59/18* (2013.01); *F16H 59/44* (2013.01); *F16H 59/70* (2013.01); *F16H 2059/663* (2013.01); *F16H 2061/0223* (2013.01); *F16H 2061/0227* (2013.01)

(58) Field of Classification Search
CPC ......... F16H 61/0213; F16H 2061/0227; F16H 2059/663; F16H 59/70; F16H 2061/0223; F16H 59/44; F16H 59/18
See application file for complete search history.

(56) References Cited

U.S. PATENT DOCUMENTS

| | | | |
|---|---|---|---|
| 2005/0143221 A1* | 6/2005 | Kuwahara | F16H 61/0213 477/97 |
| 2011/0224878 A1* | 9/2011 | Nakamura | F16H 61/66259 701/56 |
| 2016/0084374 A1* | 3/2016 | Kim | F16H 61/68 701/51 |

FOREIGN PATENT DOCUMENTS

| | | |
|---|---|---|
| JP | 3656293 B2 | 6/2005 |
| JP | 2006-071084 A | 3/2006 |
| JP | 2006-142963 A | 6/2006 |
| JP | 4424213 B2 | 3/2010 |
| JP | 2011-190839 A | 9/2011 |

(Continued)

*Primary Examiner* — David J Hlavka
(74) *Attorney, Agent, or Firm* — McDermott Will & Emery LLP

(57) ABSTRACT

A method of controlling shifts based on a relative speed between a host vehicle and a preceding vehicle includes calculating the relative speed between the host vehicle and the preceding vehicle based on a speed of the host vehicle and an inter-vehicle distance between the host vehicle and the preceding vehicle, determining whether a change condition of a shift line before stopping is satisfied, changing the shift line before stopping if the change condition of the shift line before stopping is satisfied, and performing the shift using the shift line before stopping based on a position of an accelerator pedal and the speed of the host vehicle.

11 Claims, 5 Drawing Sheets

(56) References Cited

FOREIGN PATENT DOCUMENTS

KR    10-2007-0065952 A    6/2007

\* cited by examiner

METHOD AND APPARATUS FOR CONTROLLING SHIFT BASED ON RELATIVE SPEED BETWEEN HOST VEHICLE AND PRECEDING VEHICLE

CROSS-REFERENCE TO RELATED APPLICATION

This application claims the benefit of priority to Korean Patent Application No. 10-2015-0118010, filed with the Korean Intellectual Property Office on Aug. 21, 2015, the entire contents of which are incorporated herein by reference.

TECHNICAL FIELD

The present disclosure relates to a method and an apparatus for controlling a shift based on a relative speed between a host vehicle and a preceding vehicle.

BACKGROUND

An accelerator pedal and a brake pedal for perceiving acceleration intention or deceleration intention of a driver are provided in a vehicle. If the driver has the acceleration intention, the driver pushes the accelerator pedal. If the driver has the deceleration intention, the driver takes his or her foot off the accelerator pedal and pushes the brake pedal.

When there are many vehicles in a road, a speed of a host vehicle depends on a speed of a preceding vehicle. If the speed of the preceding vehicle decreases, the driver of the host vehicle primarily takes his or her foot off the accelerator pedal to maintain an inter-vehicle distance between the host vehicle and the preceding vehicle using coasting driving. In addition, when the inter-vehicle distance cannot be maintained, the driver of the host vehicle secondarily pushes the brake pedal.

FIG. 5 illustrates a shift pattern applied to a down-shift according to the related art.

Referring to FIG. 5, if the speed of the preceding vehicle decreases in a state in which the speed of the host vehicle is 100 KPH and a currently engaged shift speed stage is an eighth shift speed stage, the driver of the host vehicle is supposed to push the brake pedal for deceleration without an engine brake effect. The shift speed stage is maintained at the eighth shift speed stage until the speed of the host vehicle becomes 60 KPH. After that, if the speed of the preceding vehicle increases, the driver of the host vehicle pushes the accelerator pedal for acceleration. In this case, if a driving force for acceleration is insufficient, a kick-down 8 to 7 shift is performed, thereby deteriorating acceleration responsiveness.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to provide a method and an apparatus of controlling shift based on a relative speed between a host vehicle and a preceding vehicle having advantages of achieving effective deceleration and improving acceleration responsiveness during re-acceleration by changing a shift line before stopping if a predetermined condition is satisfied.

A method of controlling shift based on a relative speed between a host vehicle and a preceding vehicle according to an exemplary embodiment of the present disclosure may include: calculating the relative speed between the host vehicle and the preceding vehicle based on a speed of the host vehicle and an inter-vehicle distance between the host vehicle and the preceding vehicle; determining whether a change condition of a shift line before stopping is satisfied; changing the shift line before stopping if the change condition of the shift line before stopping is satisfied; and performing the shift by using the shift line before stopping based on a position of an accelerator pedal and the speed of the host vehicle.

The determining of whether the change condition of the shift line before stopping is satisfied may include determining whether the inter-vehicle distance is within a predetermined inter-vehicle distance range.

The determining of whether the change condition of the shift line before stopping is satisfied may include determining whether the relative speed is within a predetermined relative speed range.

The determining of whether the change condition of the shift line before stopping is satisfied may include determining whether the accelerator pedal is released.

The determining of whether the change condition of the shift line before stopping is satisfied may include determining whether the speed of the host vehicle is greater than a predetermined speed.

The determining of whether the change condition of the shift line before stopping is satisfied may include determining whether a shift speed stage that is currently engaged is greater than a predetermined shift speed stage.

The determining of whether the change condition of the shift line before stopping is satisfied may include determining whether a gradient of a road is within a predetermined gradient range.

The changing of the shift line before stopping if the change condition of the shift line before stopping is satisfied may include determining a change amount of the shift line before stopping based on the relative speed.

An apparatus of controlling shift based on a relative speed between a host vehicle and a preceding vehicle according to an exemplary embodiment of the present disclosure may include: a data detector detecting data for controlling the shift; and a controller calculating the relative speed between the host vehicle and the preceding vehicle based on the data and determining whether a change condition of a shift line before stopping is satisfied, wherein the controller may change the shift line before stopping if the change condition of the shift line before stopping is satisfied, and may perform the shift by using the shift line before stopping based on a position of an accelerator pedal and a speed of the host vehicle.

The change condition of the shift line before stopping may be satisfied if an inter-vehicle distance between the host vehicle and the preceding vehicle is within a predetermined inter-vehicle distance range, the relative speed is within a predetermined relative speed range, the accelerator pedal is released, a speed of the host vehicle is greater than a predetermined speed, a shift speed stage that is currently engaged is greater than a predetermined shift speed stage, and a gradient of a road is within a predetermined gradient range.

The controller may determine a change amount of the shift line before stopping based on the relative speed if the change condition of the shift line before stopping is satisfied.

According to an exemplary embodiment of the present disclosure, if a predetermined condition is satisfied, effective deceleration may be realized and acceleration responsiveness during re-acceleration may be improved by changing the shift line before stopping.

DETAILED DESCRIPTION

Figure 1:
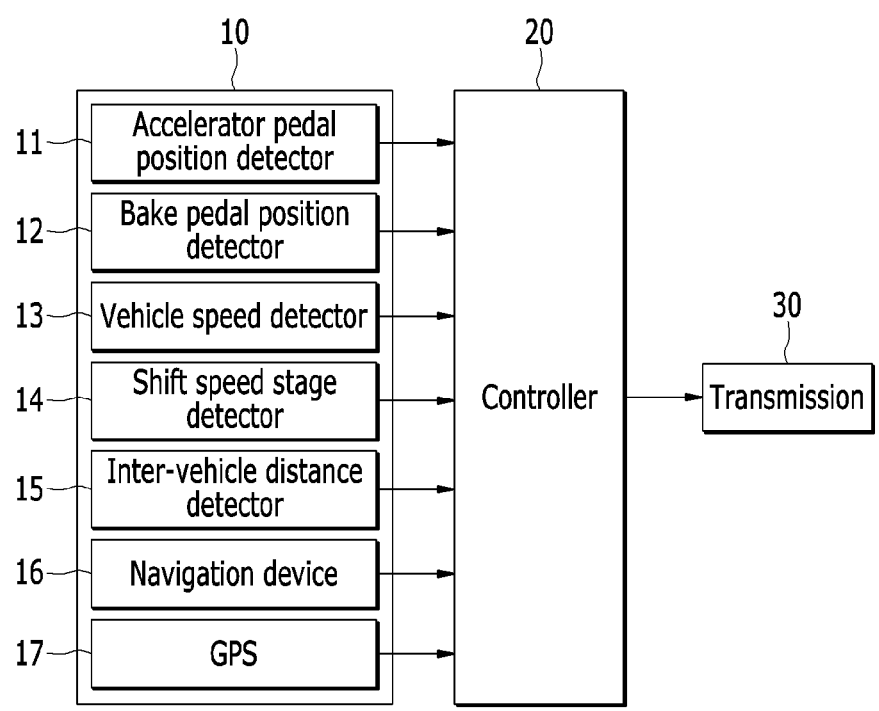
FIG. 1 is a block diagram of an apparatus of controlling shifts according to an exemplary embodiment of the present disclosure.

Hereinafter, the present disclosure will be described more fully with reference to the accompanying drawings, in which exemplary embodiments of the disclosure are shown. As those skilled in the art would realize, the described embodiments may be modified in various different ways, all without departing from spirit or scope of the present disclosure.

In addition, since each component shown in the drawings is arbitrarily illustrated for easy description, the present disclosure is not particularly limited to the components illustrated in the drawings.

FIG. 1 is a block diagram of an apparatus for controlling shifts according to an exemplary embodiment of the present disclosure.

As shown in FIG. 1, an apparatus of controlling shifts according to an exemplary embodiment of the present disclosure may include a data detector 10 and a controller 20.

The data detector 10 may detect data for controlling shifts, and the data detected by the data detector 10 may be transmitted to the controller 20. The data detector 10 may include an accelerator pedal position detector 11, a brake pedal position detector 12, a vehicle speed detector 13, a shift speed stage detector 14, an inter-vehicle distance detector 15, a navigation device 16, and a global positioning system (GPS) 17.

The accelerator pedal position detector 11 may detect a position of an accelerator pedal (pushed degree of the accelerator pedal), and may transmit a signal corresponding thereto to the controller 20. When the accelerator pedal is pushed completely, the position of the accelerator pedal may be 100%, and when the accelerator pedal is not pushed, the position of the accelerator pedal may be 0%.

The brake pedal position detector 12 may detect a position of a brake pedal (pushed degree of the brake pedal), and may transmit a signal corresponding thereto to the controller 20. When the brake pedal is pushed completely, the position of the brake pedal may be 100%, and when the brake pedal is not pushed, the position of the brake pedal may be 0%.

The vehicle speed detector 13 may detect a speed of a host vehicle and transmit a signal corresponding thereto to the controller 20. Alternatively, the controller 20 may calculate the speed of the host vehicle based on a GPS signal received by the GPS 16.

The shift speed stage detector 14 may detect a shift speed stage that is currently engaged, and may transmit a signal corresponding thereto to the controller 20. The shift speed stage may be detected when a ratio of an input speed and an output speed of a transmission 30 is detected. In addition, the shift speed stage may be detected from currently operated friction elements of the transmission 30. For example, shift speed stages which can be engaged may be first, second, third, fourth, fifth, sixth, seventh, and eighth shift speed stages and a reverse shift speed stage in an eight-speed transmission.

The inter-vehicle distance detector 15 may detect an inter-vehicle distance between a host vehicle and a preceding vehicle, and may transmit a signal corresponding thereto to the controller 20. The inter-vehicle distance detector 15 may be a radar which is used in a smart cruise control (SCC) system.

The navigation device 16 is a device which may inform a driver of a route to a destination. The navigation device 16 may include an input/output portion inputting or outputting information for guidance of the route, a current position detecting portion detecting information on a current position of the host vehicle, a memory in which map data for calculating the route and data for guiding the route are stored, and a control portion for searching the route and performing guidance of the route.

However, it is sufficient in an exemplary embodiment of the present disclosure that the navigation device 16 can provide information regarding a gradient of a road to the controller 20. Therefore, it is to be understood that the navigation device 16 includes any device which can provide the information regarding the gradient of the road to the controller 20 in this specification and claims.

The GPS 17 receives a signal transmitted from a GPS satellite and transmits a signal corresponding thereto to the navigation device 16.

The controller 20 may be implemented with one or more microprocessors executed by a predetermined program. The predetermined program may include a series of commands for performing each step included in a method of controlling shifts according to an exemplary embodiment of the present disclosure.

The controller 20 may calculate a target shift speed stage by using a shift pattern based on the signal of the accelerator pedal position detector 11 and the signal of the vehicle speed detector 13, and control the shift to the target shift speed stage. In other words, hydraulic pressure supplied to a plurality of friction elements or released from the plurality of friction elements may be controlled in the transmission 30 provided with a plurality of planetary gear sets and the plurality of friction elements.

A shift ratio of the transmission 30 may be controlled according to the control of the controller 20. The transmission 30 delivers output torque to a driving wheel to drive the host vehicle.

Hereinafter, a method of controlling shifts according to an exemplary embodiment of the present disclosure will be described in detail with reference to FIG. 2 to FIG. 4.

Figure 2:
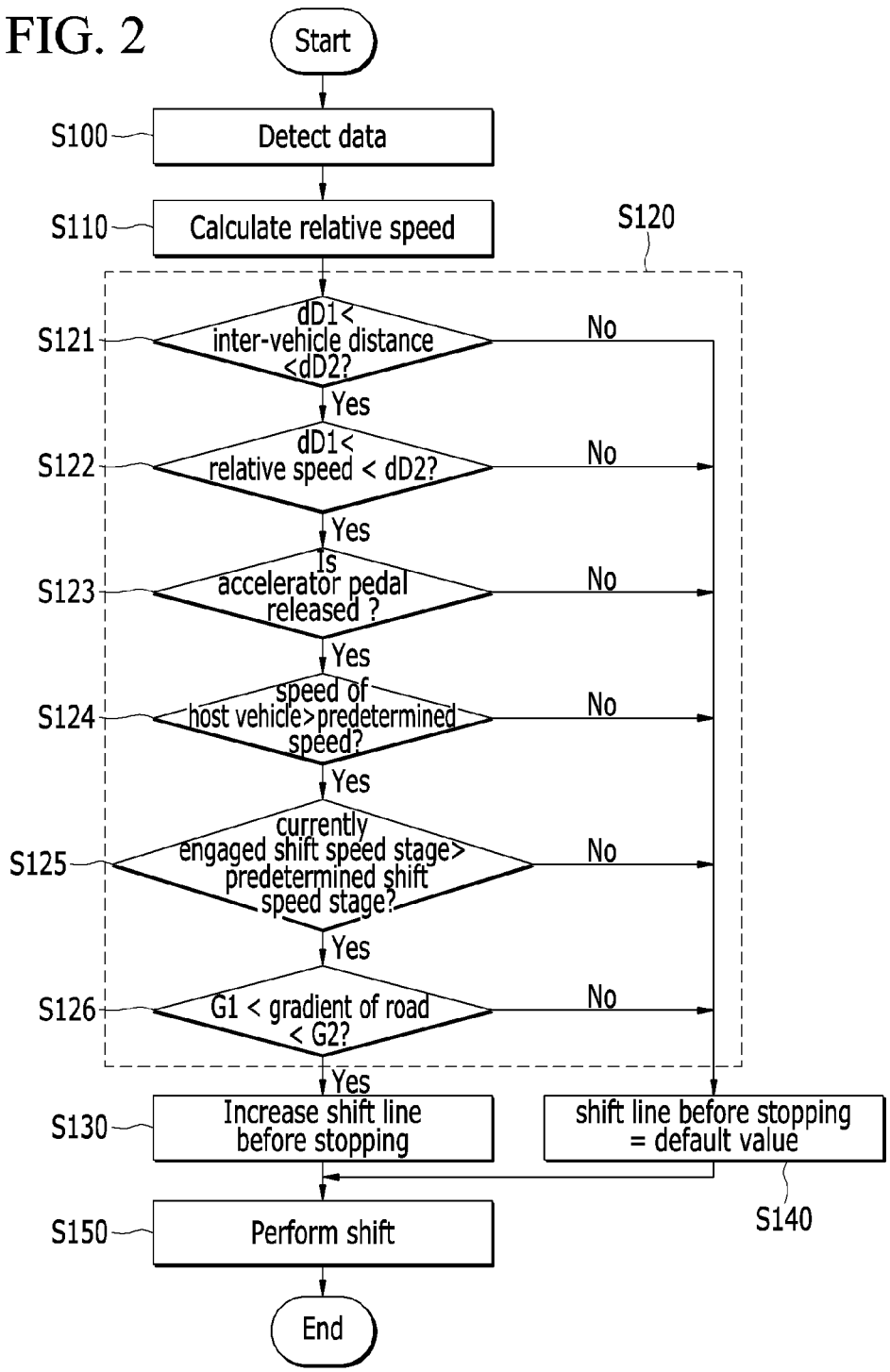
FIG. 2 is a flowchart of a method of controlling shifts according to an exemplary embodiment of the present disclosure.
Figure 3:
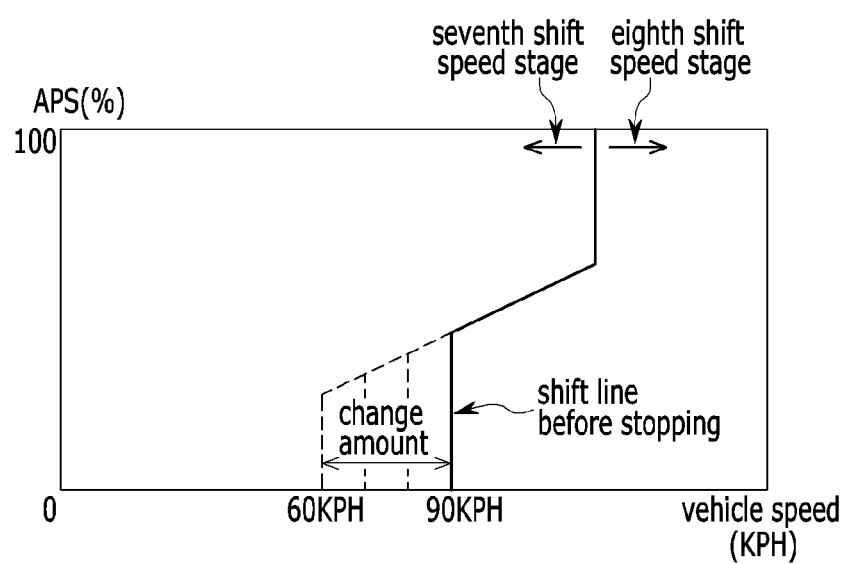
FIG. 3 is a drawing illustrating a shift pattern applied to a down-shift according to an exemplary embodiment of the present disclosure.
Figure 4:
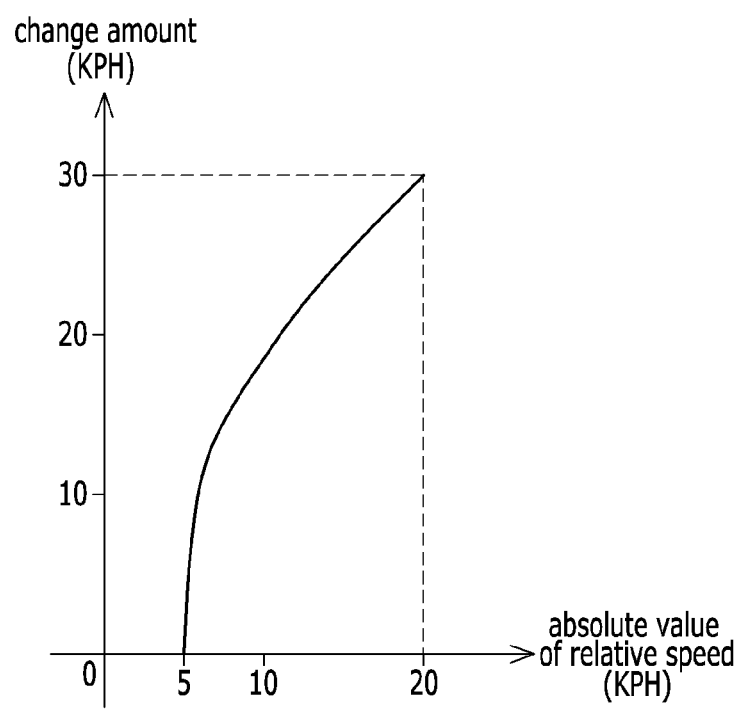
FIG. 4 is a graph illustrating a change amount of a shift line before stopping according to an exemplary embodiment of the present disclosure.
Figure 5:
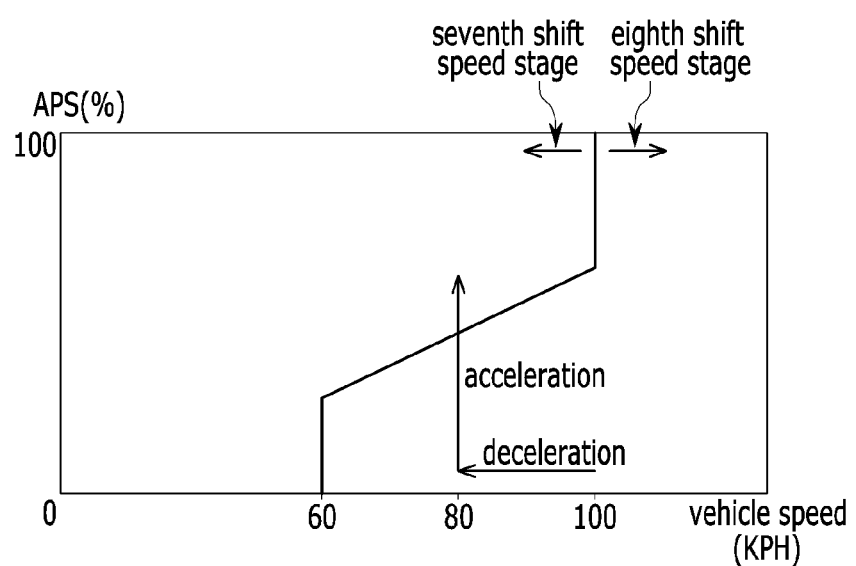
FIG. 5 is a drawing illustrating a shift pattern applied to a down-shift according to the related art.

FIG. 2 is a flowchart of a method of controlling shifts according to an exemplary embodiment of the present disclosure, FIG. 3 is a drawing illustrating a shift pattern applied to a down-shift according to an exemplary embodiment of the present disclosure, and FIG. 4 is a graph illustrating a change amount of a shift line before stopping according to an exemplary embodiment of the present disclosure.

Referring to FIG. 2 to FIG. 4, a method of controlling shifts according to an exemplary embodiment of the present disclosure begins with detecting data for controlling shifts at step S100. That is, the accelerator pedal position detector 11 may detect the position of the accelerator pedal, the brake pedal position detector 12 may detect the position of the brake pedal, the vehicle speed detector 13 may detect the speed of the host vehicle, the shift speed stage detector 14 may detect the shift speed stage that is currently engaged, the inter-vehicle distance detector 15 may detect the inter-vehicle distance between the host vehicle and the preceding vehicle, and the navigation device 16 may detect the gradient of the road.

When the data detector 10 detects the data and transmits the data to the controller 20, the controller 20 may calculate a relative speed between the host vehicle and the preceding vehicle at step S110. In detail, the controller 20 may calculate the relative speed between the host vehicle and the preceding vehicle based on the speed of the host vehicle and the inter-vehicle distance between the host vehicle and the preceding vehicle. If the inter-vehicle distance decreases, the relative speed may have a negative value, and if the inter-vehicle distance increases, the relative speed may have a positive value.

When the relative speed between the host vehicle and the preceding vehicle is calculated, the controller 20 may determine whether a change condition of a shift line before stopping is satisfied at step S120. The change condition of the shift line before stopping may include an inter-vehicle distance condition, a relative speed condition, an accelerator pedal position condition, a vehicle speed condition, a shift speed stage condition, and a gradient condition.

The controller 20 may determine whether the inter-vehicle distance condition is satisfied based on the signal received from the inter-vehicle distance detector 15 at step S121. In detail, the controller 20 may determine whether the inter-vehicle distance between the host vehicle and the preceding vehicle is within a predetermined inter-vehicle distance range (i.e., between a first inter-vehicle distance dD1 and a second inter-vehicle distance dD2). For example, the first inter-vehicle distance dD1 may be 10 m, and the second inter-vehicle distance dD2 may be 100 m.

If the inter-vehicle distance condition is not satisfied at step S121, the controller 20 may proceed to step S140.

If the inter-vehicle distance condition is satisfied at step S121, the controller 20 may determine whether the relative speed condition is satisfied based on the calculated relative speed at step S122. In detail, the controller 20 may determine whether the relative speed is within a predetermined relative speed range (i.e., between a first relative speed dV1 and a second relative speed dV2). For example, the first relative speed dV1 may be −20 KPH, and the second relative speed dV2 may be 20 KPH.

If the relative speed condition is not satisfied at step S122, the controller 20 may proceed to step S140.

If the relative speed condition is satisfied at step S122, the controller 20 may determine whether the accelerator pedal position condition is satisfied based on the signal received from the accelerator pedal position detector 11 at step S123. In detail, the controller 20 may determine whether the accelerator pedal is released (i.e., position of the accelerator pedal=0%).

If the accelerator pedal position condition is not satisfied at step S123, the controller 20 may proceed to step S140.

If the accelerator pedal position condition is satisfied at step S123, the controller 20 may determine whether the vehicle speed condition is satisfied based on the signal received from the vehicle speed detector 13 at step S124. In detail, the controller 20 may determine whether the speed of the host vehicle is greater than a predetermined speed. For example, the predetermined speed may be 40 KPH.

If the vehicle speed condition is not satisfied at step S124, the controller 20 may proceed to step S140.

If the vehicle speed condition is satisfied at step S124, the controller 20 may determine whether the shift speed stage condition is satisfied based on the signal received from the shift speed stage detector 14 at step S125. In detail, the controller 20 may determine whether the shift speed stage that is currently engaged is greater than a predetermined shift speed stage. The predetermined shift speed stage may be the fifth shift speed stage.

If the shift speed stage condition is not satisfied at step S125, the controller 20 may proceed to step S140.

If the shift speed stage condition is satisfied at step S125, the controller 20 may determine whether the gradient condition is satisfied based on the signal received from the navigation device 16 at step S126. In detail, the controller 20 may determine whether the gradient of the road is within a predetermined gradient range (i.e., between a first gradient G1 and a second gradient G2). For example, the first gradient G1 may be −5% and the second gradient G2 may be 2%. If the gradient of the road is not within the predetermined gradient range, it is typical for the host vehicle to operate not according to the inter-vehicle distance but according to the gradient of the road.

If the gradient condition is not satisfied at step S126, the controller 20 may proceed to step S140. If the gradient condition is satisfied at step S126, the controller 20 may proceed to step S130.

Steps S121 to S126 may be simultaneously performed, or may be separately performed regardless of the sequence.

If the change condition of the shift line before stopping at step S120, the controller 20 may change the shift line before stopping at step S130. The controller 20 may determine a change amount of the shift line before stopping based on the relative speed. As shown in FIG. 4, the change amount of the shift line before stopping may be determined a value that increases as an absolute value of the relative speed.

Meanwhile, if the change condition of the shift line before stopping is not satisfied at step S120, the controller 20 may maintain the shift line before stopping as a default value at step S140.

The controller 20 may perform the shift by using the shift line before stopping based on the position of the accelerator pedal and the speed of the host vehicle at step S150. As shown in FIG. 3, as the shift line before stopping increases, a down-shift may be performed at a relatively high speed during deceleration. Accordingly, the deceleration may be efficiently performed using an engine brake effect. In addition, after the down-shift is performed, if the driver of the host vehicle pushes the accelerator pedal for re-acceleration, the host vehicle may be accelerated at a low shift speed stage without a kick-down shift, thereby improving acceleration responsiveness.

As described above, according to an exemplary embodiment of the present disclosure, effective deceleration may be realized and acceleration responsiveness during re-acceleration may be improved by changing the shift line before stopping if the predetermined condition is satisfied.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A method of controlling shifts based on a relative speed between a host vehicle and a preceding vehicle, comprising:
   calculating the relative speed between the host vehicle and the preceding vehicle based on a speed of the host vehicle and an inter-vehicle distance between the host vehicle and the preceding vehicle;
   determining whether a change condition of a shift line before stopping is satisfied;
   changing the shift line before stopping if the change condition of the shift line before stopping is satisfied; and
   performing the shift using the shift line before stopping based on a position of an accelerator pedal and the speed of the host vehicle.

2. The method of claim 1, wherein the step of determining whether the change condition of the shift line before stopping is satisfied comprises determining whether the inter-vehicle distance is within a predetermined inter-vehicle distance range.

3. The method of claim 1, wherein the step of determining whether the change condition of the shift line before stopping is satisfied comprises determining whether the relative speed is within a predetermined relative speed range.

4. The method of claim 1, wherein the step of determining whether the change condition of the shift line before stopping is satisfied comprises determining whether the accelerator pedal is released.

5. The method of claim 1, wherein the step of determining whether the change condition of the shift line before stopping is satisfied comprises determining whether the speed of the host vehicle is greater than a predetermined speed.

6. The method of claim 1, wherein the step of determining whether the change condition of the shift line before stopping is satisfied comprises determining whether a shift speed stage that is currently engaged is greater than a predetermined shift speed stage.

7. The method of claim 1, wherein the step of determining whether the change condition of the shift line before stopping is satisfied comprises determining whether a gradient of a road is within a predetermined gradient range.

8. The method of claim 1, wherein the changing of the shift line before stopping if the change condition of the shift line before stopping is satisfied comprises determining a change amount of the shift line before stopping based on the relative speed.

9. An apparatus of controlling shifts based on a relative speed between a host vehicle and a preceding vehicle, comprising:
   a data detector for detecting data for controlling the shift; and
   a controller for calculating the relative speed between the host vehicle and the preceding vehicle based on the data and determining whether a change condition of a shift line before stopping is satisfied,
   wherein the controller changes the shift line before stopping if the change condition of the shift line before stopping is satisfied, and performs the shift using the shift line before stopping based on a position of an accelerator pedal and a speed of the host vehicle.

10. The apparatus of claim 9, wherein the change condition of the shift line before stopping is satisfied if an inter-vehicle distance between the host vehicle and the preceding vehicle is within a predetermined inter-vehicle distance range, the relative speed is within a predetermined relative speed range, the accelerator pedal is released, a speed of the host vehicle is greater than a predetermined speed, a shift speed stage that is currently engaged is greater than a predetermined shift speed stage, and a gradient of a road is within a predetermined gradient range.

11. The apparatus of claim 9, wherein the controller determines a change amount of the shift line before stopping based on the relative speed if the change condition of the shift line before stopping is satisfied.

* * * * *